United States Patent
Wu

(10) Patent No.: US 9,320,057 B2
(45) Date of Patent: Apr. 19, 2016

(54) METHOD AND APPARATUS FOR PERFORMING MACHINE-TYPE COMMUNICATION DEVICE ACCESS IN WIRELESS COMMUNICATION SYSTEM

(71) Applicant: HTC Corporation, Taoyuan County (TW)

(72) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 262 days.

(21) Appl. No.: 13/845,125

(22) Filed: Mar. 18, 2013

(65) Prior Publication Data

US 2013/0242912 A1 Sep. 19, 2013

Related U.S. Application Data

(60) Provisional application No. 61/611,584, filed on Mar. 16, 2012.

(51) Int. Cl.
*H04W 74/08* (2009.01)
*H04W 4/00* (2009.01)
*H04W 74/00* (2009.01)

(52) U.S. Cl.
CPC .......... *H04W 74/0833* (2013.01); *H04W 4/005* (2013.01); *H04W 74/006* (2013.01)

(58) Field of Classification Search
CPC .......................... H04W 74/0833; H04W 4/005
USPC ......................................................... 370/329
See application file for complete search history.

(56) References Cited

U.S. PATENT DOCUMENTS

2013/0294363 A1* 11/2013 Feng et al. .................... 370/329
2014/0079011 A1* 3/2014 Wiberg et al. ................. 370/329
2014/0080490 A1* 3/2014 Bergstrom et al. ........... 455/437

OTHER PUBLICATIONS

3GPP TR 36.888 V1.0.0, Feb. 2012.
3GPP TS 36.300 V11.1.0, Mar. 2012.
3GPP TS 36.321 V10.4.0, Dec. 2011.

* cited by examiner

*Primary Examiner* — Mark Rinehart
*Assistant Examiner* — Matthew Hopkins
(74) *Attorney, Agent, or Firm* — Winston Hsu; Scott Margo

(57) ABSTRACT

A method of performing machine-type communication (MTC) device access in a network of a wireless communication system is disclosed. The method comprises generating system information comprising a resource allocation dedicated to the MTC device access for a MTC device not capable of utilizing full system bandwidth of the network; and broadcasting the system information.

14 Claims, 7 Drawing Sheets

METHOD AND APPARATUS FOR PERFORMING MACHINE-TYPE COMMUNICATION DEVICE ACCESS IN WIRELESS COMMUNICATION SYSTEM

CROSS REFERENCE TO RELATED APPLICATIONS

This application claims the benefit of U.S. Provisional Application No. 61/611,584, filed on Mar. 16, 2012, entitled "Method and Apparatus for supporting a MTC device access in a wireless communication system", the contents of which are incorporated herein in their entirety.

BACKGROUND OF THE INVENTION

1. Field of the Invention

The application relates to a method and apparatus utilized in a wireless communication system, and more particularly, to a method and apparatus of performing machine-type communication device access in a wireless communication system.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

A machine type communication (MTC) device which can automatically perform predefined jobs and report corresponding results to other devices, a server, a NB or an eNB can be used in various areas, such as security, tracking and tracing, payment, healthcare, metering, etc. Further, the MTC device preferably reports the corresponding results via a wireless link such that limitation caused by environment can be removed. However, the wireless link used by the MTC device is needed to be established, and radio resource required by the wireless link is needed to be allocated (i.e., assigned). Reuse of existing infrastructures and wireless communication systems become a viable choose for operation of the MTC device. Therefore, the UMTS, the LTE system and the LTE-A system, etc., developed by the 3GPP which are widely deployed are suitable for the operation of the MTC device.

However, a maximum bandwidth (i.e., access bandwidth) supported by the MTC device is usually narrower than a legacy UE in order to reduce cost of the MTC device. Therefore, the MTC device may not operate in a cell with system bandwidth wider than the maximum bandwidth supported by the MTC device. For example, the system bandwidth of the cell is 20 MHz and the maximum bandwidth supported by the MTC device is 5 MHz. The MTC device may receive control signals carrying system information to camp on the cell but not be capable of receiving data on a physical downlink shared channel (PDSCH) or transmitting data on a physical uplink shared channel (PUSCH) in a subframe since the PDSCH and PUSCH are allocated out of the bandwidth supported by the MTC device. Therefore, the MTC device may not have any data access.

SUMMARY OF THE INVENTION

The present invention therefore provides a method and apparatus for performing machine-type communication (MTC) device access in a wireless communication system, to avoid the failure of data transmissions.

A method of performing MTC device access in a network of a wireless communication system is disclosed. The method comprises generating a system information comprising a resource allocation dedicated to the MTC device access for a MTC device not capable of utilizing full system bandwidth of the network; and broadcasting the system information.

A method of performing MTC device access in a MTC device of a wireless communication system is disclosed. The method comprises receiving system information from a network of the wireless communication system; determining whether the received system information comprises resource allocation dedicated to the MTC device access for a MTC device not capable of utilizing full system bandwidth of the network; and transmitting a random access preamble by using the resource allocation dedicated to the MTC device access in the system information to the network, when the resource allocation in the system information has been detected.

A communication apparatus for a wireless communications system is disclosed. The communication apparatus comprises a processing means; a storage unit; and a program code, stored in the storage unit, wherein the program code instructs the processing means to execute the following steps: generating a system information comprising a resource allocation dedicated to machine-type communication (MTC) device access for a MTC device not capable of utilizing full system bandwidth of the communication apparatus; and broadcasting the system information A communication apparatus for a wireless communications system is disclosed. The communication apparatus comprises a processing means; a storage unit; and a program code, stored in the storage unit, wherein the program code instructs the processing means to execute the following steps: receiving system information from a network of the wireless communication system; determining whether the received system information comprises resource allocation dedicated to machine-type communication (MTC) device access for a MTC device not capable of utilizing full system bandwidth of the network; and transmitting a random access preamble by using the resource allocation dedicated to the MTC device access in the system information to the network, when the resource allocation in the system information has been detected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
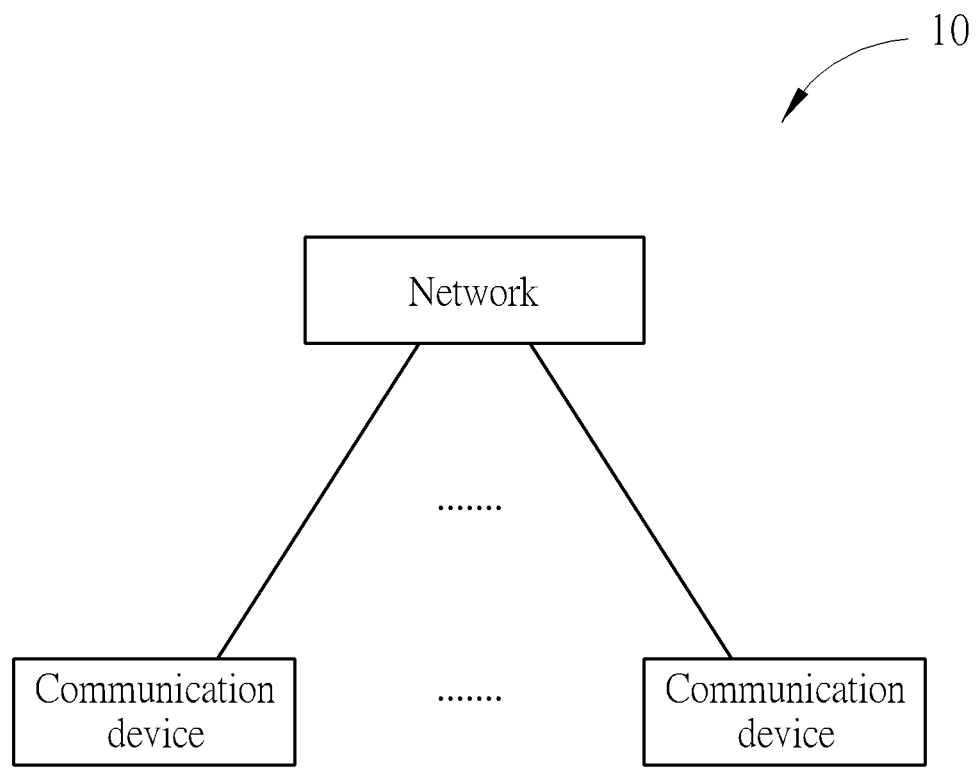
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The communication devices can be machine-type communication (MTC) devices for performing MTC with the network. Alternatively, the communication devices can be mobile phones, laptops, tablet computers, electronic books, and portable computer systems wherein a MTC function is enabled for performing the MTC with the network. The communication devices can also be referred to mobile stations (MSs) or user equipments (UEs) with the MTC function in the UMTS, the LTE system or the LTE-A system, for performing the MTC with the network. Besides, the network and a communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
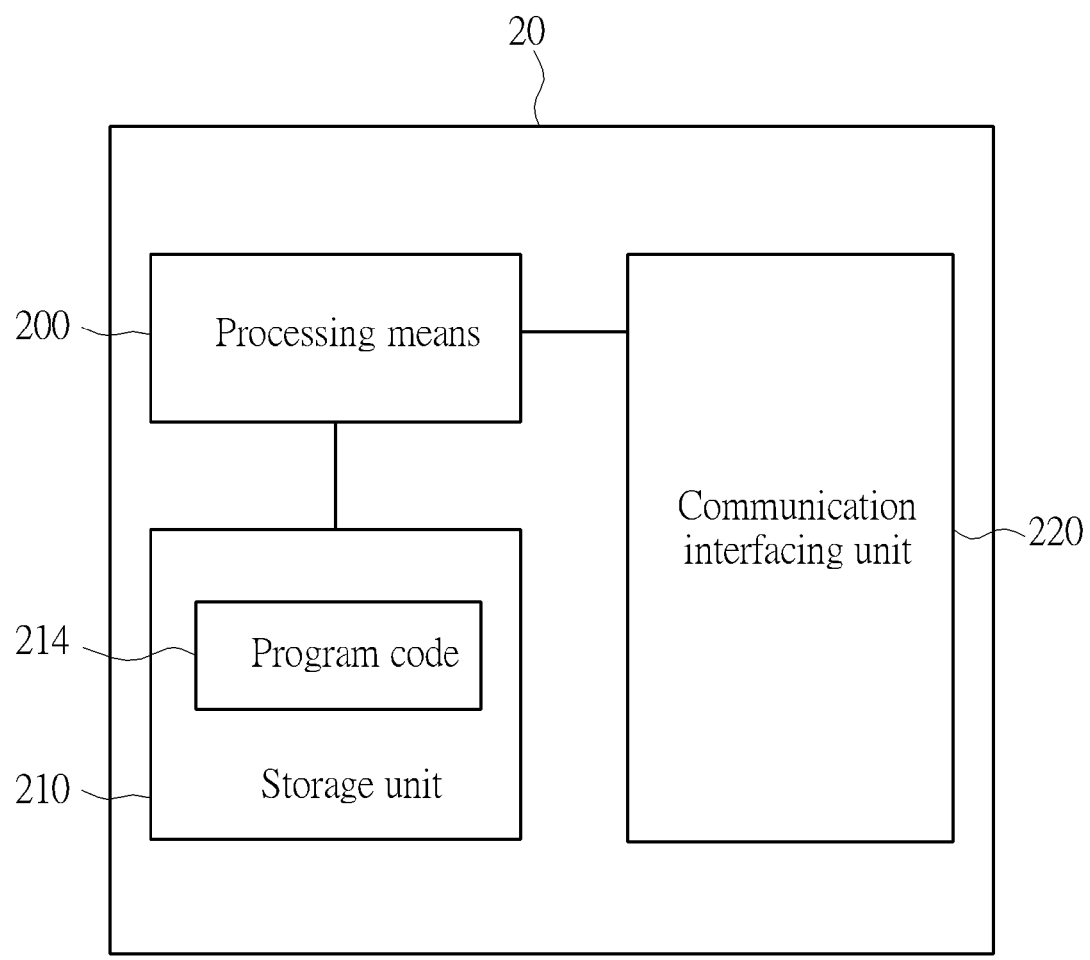
FIG. 2 is a schematic diagram of a communication apparatus according to an example of the present invention.

Please refer to FIG. 2, which is a schematic diagram of a communication device 20 according to an example of the present invention. The communication device 20 can be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 maybe any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
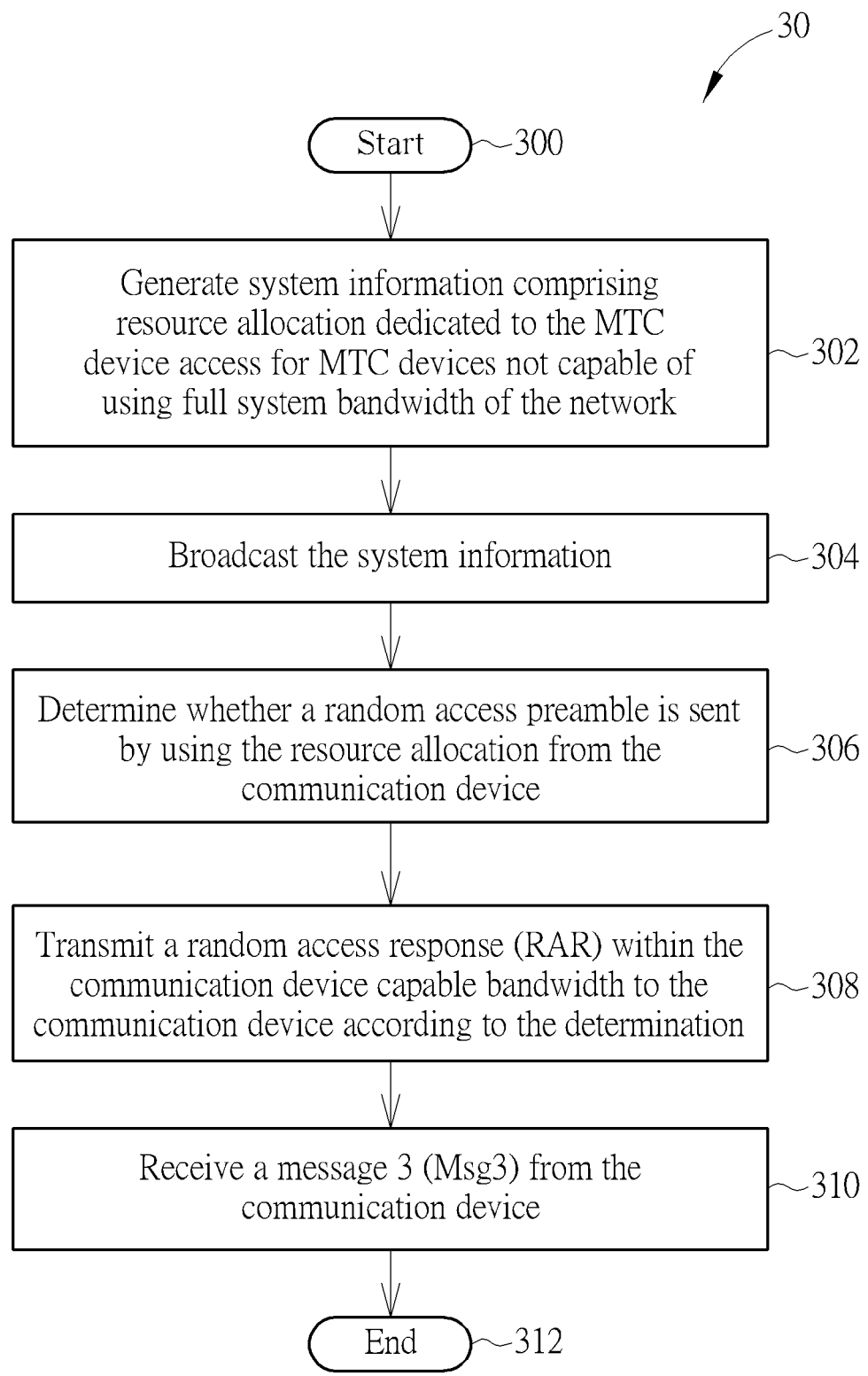
FIG. 3 is a flowchart of a process according to an example of the present invention.

Please refer to FIG. 3, which is a flowchart of a process 30 according to an example of the present invention. The process 30 is utilized in the network of the wireless communication system 10 shown in FIG. 1, for performing MTC device access. The process 30 may be compiled into the program code 214. The process 30 includes the following steps:

Step 300: Start.

Step 302: Generate system information comprising resource allocation dedicated to the MTC device access for MTC devices not capable of using full system bandwidth of the network.

Step 304: Broadcast the system information.

Step 306: Determine whether a random access preamble is sent by using the resource allocation from the communication device.

Step 308: Transmit a random access response (RAR) within the communication device capable bandwidth to the communication device according to the determination.

Step 310: Receive a message 3 (Msg3) from the communication device.

Step 312: End.

Figure 4:
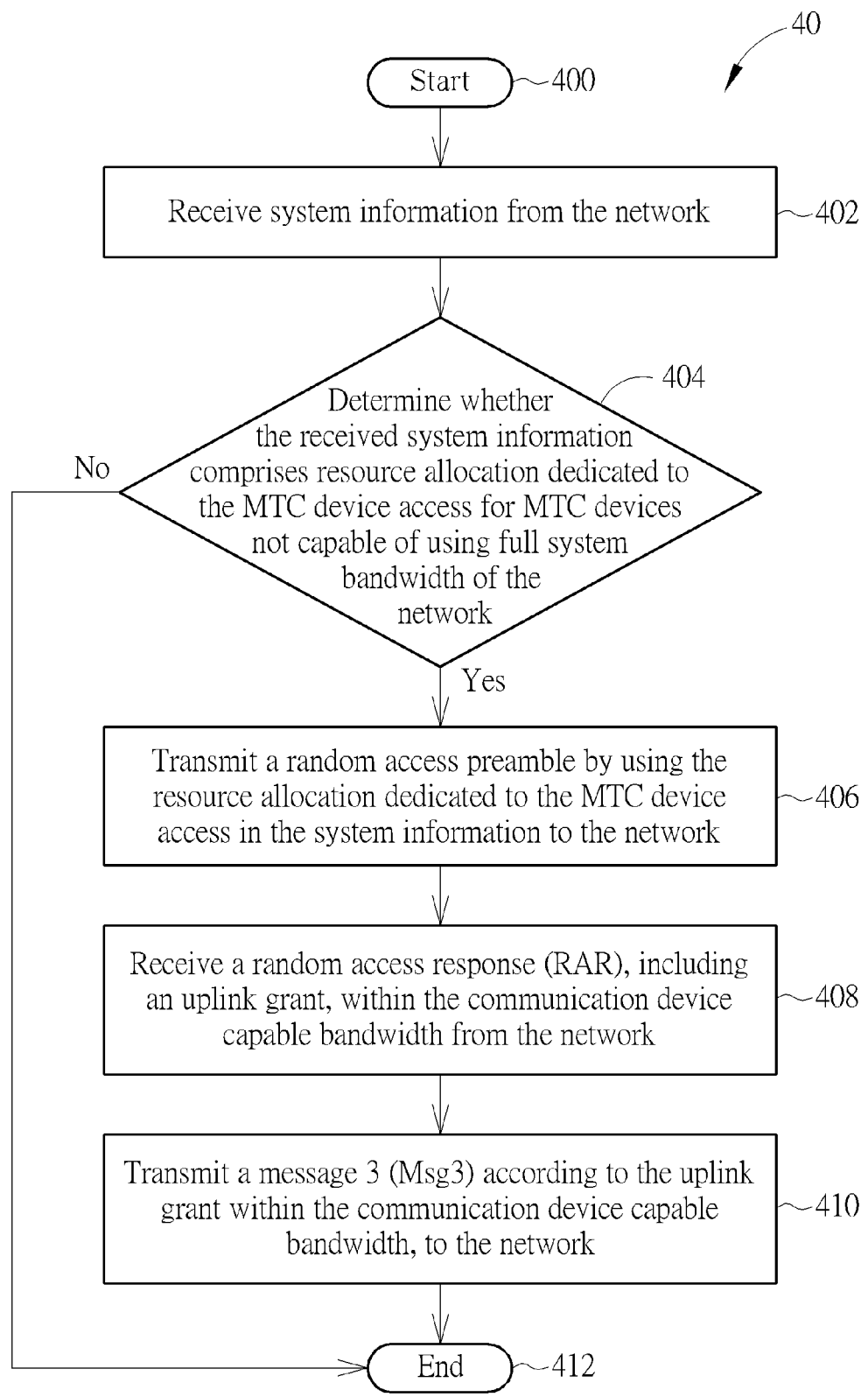
FIG. 4 is a flowchart of a process according to an example of the present invention.

Further refer to FIG. 4, which is a flowchart of a process 40 according to an example of the present invention. The process 40 is utilized in a communication device of the wireless communication system 10 shown in FIG. 1, for performing MTC device access, and the communication device performing the process 40 is preferably a MTC device which is not capable of using full system bandwidth of the network. The process 40 may be compiled into the program code 214. The process 40 includes the following steps:

Step 400: Start.

Step 402: Receive system information from the network.

Step 404: Determine whether the received system information comprises resource allocation dedicated to the MTC device access for MTC devices not capable of using full system bandwidth of the network. If yes, perform Step 406; else, perform Step 412.

Step 406: Transmit a random access preamble by using the resource allocation dedicated to the MTC device access in the system information to the network.

Step 408: Receive a random access response (RAR), including an uplink grant, within the communication device capable bandwidth from the network.

Step 410: Transmit a message 3 (Msg3) according to the uplink grant within the communication device capable bandwidth, to the network.

Step 412: End.

In the process 30, the network informs the communication device the resource allocation dedicated to the MTC device access by broadcasting the resource allocation in the system information (Step 302). Therefore, the communication device can transmit the random access preamble by using the resource allocation (Step 406) and the network can transmit the RAR (Step 306) and the acknowledgment response within the communication device capable bandwidth. The RAR contains the uplink grant arranging Msg3 transmission within the communication device capable bandwidth. If the network receives a random access preamble sent by not using the resource allocation, the networks determines (Step 304) that the random access preamble is sent for a communication device capable of full system bandwidth. The resource allocation may include at least one random access preamble so that the communication device may select one random access preamble from the at least one random access preamble and transmit the random access preamble. The resource allocation may include a resource location for the communication device to transmit a random access preamble. The resource location is defined by at least one of frequency resource and time resource. The frequency resource may comprise at least one subcarrier and the time resource may comprise at least one subframe number in a frame with a specific system frame number (SFN). When the network receives a random access preamble which is selected from the at least one random access preamble or is sent on the resource location, the network determines the communication device capable bandwidth is narrower than the system bandwidth used by the network and responds to transmit the RAR within the communication device capable bandwidth.

In detail, in Step 406, the random access preamble is sent by using the resource allocation from the communication device to the network, for performing the random access procedure so as to access the network. Besides, in Step 308, the RAR is transmitted within the communication device capable bandwidth to the communication device to continue the random access procedure. The network assigns uplink resource blocks in the uplink grant to arrange the transmission within the communication device capable bandwidth in the RAR so that in Step 410, the communication device is able to send the Msg3 within the communication device capable bandwidth. Then the network transmits a contention resolution message within the communication device capable bandwidth in response to the Msg3 so as to complete the random access procedure. Besides, the network transmits an acknowledgment response (e.g. HARQ acknowledgement or HARQ negative acknowledgement) within the communication device capable bandwidth since the network knows the communication device is not capable of the full system bandwidth in Step 306. The resource allocation for transmitting the acknowledgement response may be predetermined in the 3GPP specification, or notified in the system information or the RAR.

After the random access procedure completes, the network transmits downlink control signaling (e.g. PDCCH) and data (e.g. PDSCH) within the communication device capable bandwidth, and arranges or configures uplink transmission (e.g. PUSCH or PUCCH) happened within the communication device capable bandwidth.

Note that, the process 30 is an example of the present invention. Those skilled in the art should readily make combinations, modifications and/or alterations on the abovementioned description and examples. For example, the system information may comprise at least one of a master information block (MIB), one of system information blocks (SIB) and a newly-defined system information block. The system information may include an indicator, such as one bit with a value '0' or '1', or a flag with TRUE or FALSE, used for indicating the support of the MTC device access. Moreover, the resource allocation may be predetermined in the 3rd Generation Partnership Project (3GPP) specification instead of broadcasting the system information.

Besides, a communication device not capable of full system bandwidth may have maximum capable bandwidth different from another communication device not capable of full system bandwidth. In other words, different MTC devices may support different bandwidth. The network transmits a plurality of resource allocations for the communication devices with different maximum capable bandwidths to perform random access. A first communication device with a first maximum capable bandwidth uses first resource allocation to perform random access, and a second communication device with a second maximum capable bandwidth uses second resource allocation to perform random access. Therefore the network can know maximum capable bandwidth of the communication device according to the plurality of resource allocations. For example, the first resource allocation includes a first random access preamble and the second resource allocation includes a second random access preamble. The first random access preamble is different from the second random access preamble. When the network receives the first random access preamble from the first communication device, the networks knows maximum capable bandwidth of the first communication device accordingly. When the network receives the second random access preamble from the second communication device, the networks knows maximum capable bandwidth of the second communication device. For another example, the first resource allocation includes a first resource location and the second resource allocation includes a second resource location. The first resource location and second resource location are different. When the network receives a first random access preamble on the first resource location, the networks knows maximum capable bandwidth of the first communication device. When the network receives a second random access preamble on the second resource location, the networks knows maximum capable bandwidth of the second communication device. Note that the first random access preamble and the second random access preamble may be same.

Figure 5:
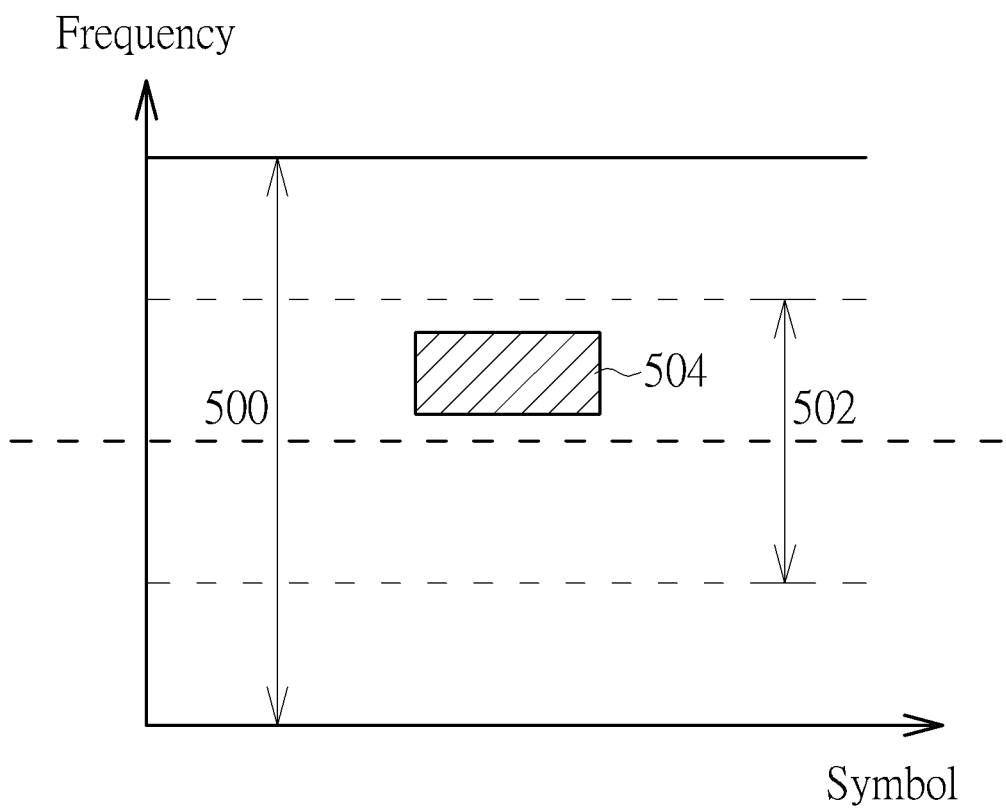
FIG. 5 is a schematic diagram of a communication apparatus assigning physical layer resources for downlink transmission according to an example of the present invention.
Figure 6:
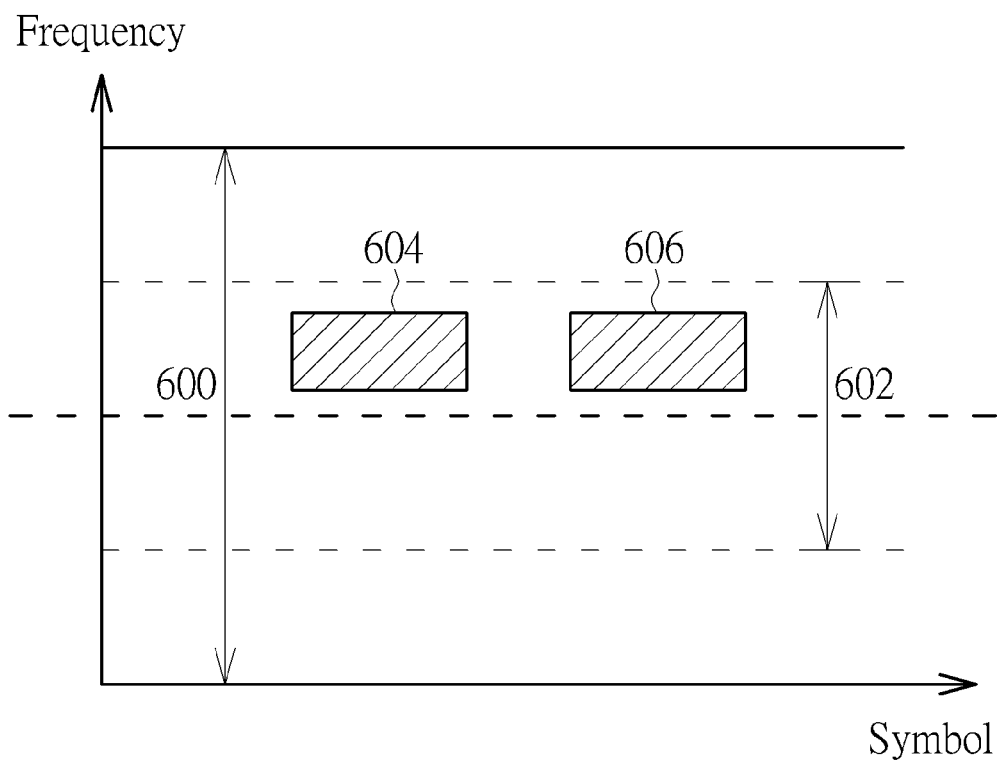
FIG. 6 is a schematic diagram of a communication apparatus assigning physical layer resources for uplink transmission according to an example of the present invention.
Figure 7:
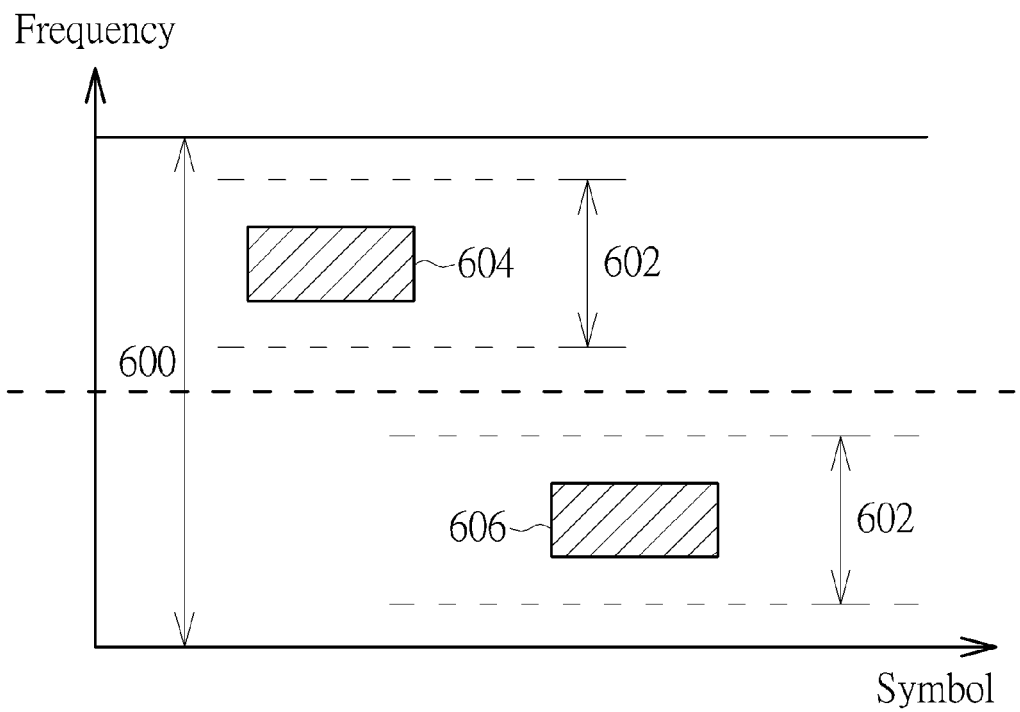
FIG. 7 is a schematic diagram of a communication apparatus assigning physical layer resources for uplink transmission according to an example of the present invention.

In another aspect, the first resource location and second resource location for transmissions between the communication device and the network may be determined in any resource locations as long as the determination of the first resource location and second resource location achieves the requirement of the communication device capable bandwidth and the system bandwidth of the network. For example, as shown in FIG. 5, a resource location 504 used by the network to transmit the RAR in the downlink direction is in the center of the system bandwidth 500 of the network, in which the communication device capable bandwidth 502 is narrower than the system bandwidth 500. In FIG. 6, resource locations 604 and 606 assigned for the communication device to transmit the preamble and the Msg3 in the uplink direction are allocated in the center of the system bandwidth 600 of the network, in which the communication device capable bandwidth 602 is narrower than the system bandwidth 600. On the contrary, in FIG. 7, the resource locations 604 and 606 assigned for the communication device to transmit the preamble and the Msg3 are not allocated in the center of the system bandwidth 600 but still within the communication device capable bandwidth 602.

In brief, the communication device camps on the network and performs the random access procedure according to the resource allocation. Therefore, the communication device not capable of using full system bandwidth of the network can successfully access the network.

Note that, the communication device is not allowed to camp on the network when the resource allocation is not sent in the system information (i.e. the network is a legacy network which does not implement the relevant feature) or the system information indicates that the network does not support the MTC device access, so that the communication device should select another network to camp on.

In the present invention, the network sends the system information to indicate the support of the MTC device access and even provides the physical layer resources for the communication device to perform the random access procedure. Therefore, the communication device not capable of using full system bandwidth of the network can access the network normally.

To sum up, the present invention provides a method to perform the MTC device access, so that the communication device not capable of using full system bandwidth of the network can access the network normally.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing machine-type communication (MTC) device access in a communication network of a wireless communication system, the method comprising:
   the communication network generating a system information comprising a resource allocation dedicated to the MTC device access for a MTC device capable of a maximum bandwidth less than a cell bandwidth of the communication network, wherein the resource allocation comprises at least one random access preamble for the MTC device to transmit one of the at least one random access preamble or at least one resource location for the MTC device to transmit a random access preamble;
   the communication network broadcasting the system information;
   the communication network determining whether the random access preamble is sent according to the resource allocation from the MTC device; and
   the communication network transmitting a random access response (RAR) within the communication device capable bandwidth to the MTC device according to the determination, wherein the random access preamble is selected from the at least one random access preamble in the resource allocation or sent on a resource location in the resource allocation.

2. The method of claim 1, wherein the system information comprises an indicator for indicating the support of the MTC device access.

3. The method of claim 1, wherein the method further comprises:
   the communication network receiving a message 3 (Msg3) from the MTC device,
   wherein the Msg3 is sent according to an uplink grant which is allocated within the MTC device capable bandwidth in the RAR by the communication network.

4. A method of performing machine-type communication (MTC) device access in a MTC device of a wireless communication system, the method comprising:
   the MTC device receiving system information from a network of the wireless communication system, wherein the system information comprises an indicator for indicating the support of the MTC device access;
   the MTC device camping on the network according to the system information when the indicator indicating the support of the MTC device access;
   the MTC device determining whether the received system information comprises resource allocation dedicated to the MTC device access for a MTC device capable of a maximum bandwidth less than a cell bandwidth of the network when camping on the network; and
   the MTC device transmitting a random access preamble by using the resource allocation dedicated to the MTC device access in the system information to the network, when the resource allocation in the system information has been detected.

5. The method of claim 4, further comprises the MTC device not allowed to camp on the network when the indicator indicating not support of the MTC device access.

6. The method of claim 4, wherein the resource allocation comprises at least one random access preamble for the MTC device to transmit one of the at least one random access preamble or at least one resource location for the MTC device to transmit the random access preamble; and the random access preamble is selected from the at least one random access preamble in the resource allocation or sent on a resource location in the resource allocation.

7. The method of claim 6, wherein the method further comprises:
   the MTC device receiving a random access response (RAR) within the communication device capable bandwidth from the network; and
   the MTC device transmitting a message 3 (Msg3) to the network according to an uplink grant arranging transmission within the communication device capable bandwidth in the RAR.

8. A communication apparatus for a wireless communications system, comprising:
   a processing means; and
   a storage unit coupled to the processing means for storing a program code, wherein the program code instructs the processing means to execute the following steps:
      generating a system information comprising a resource allocation dedicated to machine-type communication (MTC) device access for a MTC device capable of a maximum bandwidth less than a cell bandwidth of the communication apparatus, wherein the resource allocation comprises at least one random access preamble for the MTC device to transmit one of the at least one random access preamble or at least one resources location for the MTC device to transmit a random access preamble;
      broadcasting the system information;
      determining whether the random access preamble is sent according to the resource allocation from the MTC device; and
      transmitting a random access response (RAR) within the communication device capable bandwidth to the MTC device according to the determination, wherein the random access preamble is selected from the at least one random access preamble in the resource allocation or sent on a resource location in the resource allocation.

9. The communication apparatus of claim 8, wherein the system information comprises an indicator for indicating the support of the MTC device access.

10. The communication apparatus of claim 8, wherein the program code further instructs the processing means to execute:

receiving a message 3 (Msg3) from the MTC device, wherein the Msg3 is sent according to an uplink grant which is allocated within the MTC device capable bandwidth in the RAR by the communication apparatus.

11. A communication apparatus for a wireless communications system, comprising:
- a processing means; and
- a storage unit coupled to the processing means for storing a program code, wherein the program code instructs the processing means to execute the following steps:
    - receiving system information from a network of the wireless communication system, wherein the system information comprises an indicator for indicating the support of the MTC device access;
    - camping on the network according to the system information when the indicator indicating the support of the MTC device access;
    - determining whether the received system information comprises resource allocation dedicated to machine-type communication (MTC) device access for a MTC device capable of a maximum bandwidth less than a cell bandwidth of the network when camping on the network; and
    - transmitting a random access preamble by using the resource allocation dedicated to the MTC device access in the system information to the network, when the resource allocation in the system information has been detected.

12. The communication apparatus of claim 11, wherein the program code further instructs the processing means to execute: not allowed to camp on the network when the indicator indicating not support of the MTC device access.

13. The communication apparatus of claim 11, wherein the resource allocation comprises at least one random access preamble for the MTC device to transmit one of the at least one random access preamble or at least one resource location for the MTC device to transmit the random access preamble; and the random access preamble is selected from the at least one random access preamble in the resource allocation or sent on a resource location in the resource allocation.

14. The communication apparatus of claim 13, wherein the program code further instructs the processing means to execute:
- receiving a random access response (RAR) within the communication device capable bandwidth from the network; and
- transmitting a message 3 (Msg3) to the network according to an uplink grant arranging transmission within the communication apparatus capable bandwidth in the RAR.

* * * * *